United States Patent Office 3,695,876

Patented Oct. 3, 1972

3,695,876
PHOTOSENSITIVE LAYER FROM THE ELECTROLYSIS OF SILVER AND HALIDE IONS

Arnold Hoffman, Brookline, Mass., assignor to Polaroid Corporation, Cambridge, Mass.

No Drawing. Filed Nov. 27, 1970, Ser. No. 93,439
Int. Cl. G03c 5/54
U.S. Cl. 96—29 19 Claims

ABSTRACT OF THE DISCLOSURE

A photosensitive element suitable for use in diffusion transfer processes is prepared by imposing a constant current to a layer of silver in the presence of halide ions. The thus-produced photosensitive element comprises a layer of silver wherein a depth of at least three microns apparent thickness (based on Faraday's law for the number of coulombs consumed for forming silver halide having a density of about 6) is converted to silver halide.

BACKGROUND OF THE INVENTION

Binderless photosensitive elements, for example, light-sensitive materials not disposed in a conventional matrix or binder material such as gelatin, for example, vacuum deposited silver disposed on a plastic support by evaporative or sputtering techniques, have the advantage of more efficient utilization of silver and resolution is generally better than that obtained with silver halide disposed in a binder. Physical distortion caused by swelling and hardening which may occur in binder systems is avoided. However, such binderless systems suffer from a number of deficiencies, primarily with respect to lack of speed.

Evaporative techniques have been disclosed to provide thicknesses of silver of up to 3.5 microns. However, the art has considered such a thickness to be an extreme, and the goal has been to obtain ultra-thin layers and maximum response is reported to be obtained about 0.1 to 0.2 micron either side of 0.3 micron. See for example, U.S. Pat. No. 3,219,448.

Such binderless systems may be prepared by depositing silver halide on a substrate by evaporative techniques or by the evaporation of silver, for example, from a molten pool, onto a suitable substrate and contemporaneously with such evaporation or subsequent thereto contacting the silver with the particular halogen preferred to provide the desired photosensitive elements.

A method has now been found for preparing novel binderless photosensitive elements which is not susceptible to deficiencies of the prior art.

SUMMARY OF THE INVENTION

A novel photosensitive element comprising a layer of silver having a surface of silver halide at least three microns in thickness according to Faraday's law for the number of coulombs consumed for forming silver halide having a density of about 6. The novel photosensitive element is prepared by applying to a layer of silver a constant current in the presence of halide ions for a time sufficient to provide the above-described minimum thickness silver halide layer. The silver may be foil or plate and may be supported or unsupported. For example, silver may be deposited on a suitable substrate by vacuum evaporative techniques, by coating, laminating or other conventional methods of deposition. The halide layer is prepared by employing said silver as one electrode immersed in a solution containing the desired halide ions. A constant current is applied to the system to provide the above-mentioned minimum conversion of silver to silver halide.

The halides employed are those conventionally used in the formation of photosensitive silver halide elements, and thus may be chloride, bromide, iodide or mixed halides. Preferably, bromide and iodide are employed. Such halide ions are provided by salts such as potassium bromide, potassium iodide, and the like.

The novel photosensitive elements of the present invention are preferably employed in silver salt diffusion transfer processes. Thus, the photosensitive element is exposed and contacted with a developing agent while in superposed relationship with a receiving sheet, e.g., a suitable substrate adapted to receive exposed and developed silver halide grains. Preferably, said receiving sheet includes silver precipitating nuclei therein to assist in the deposition of the transferred silver image. Subsequent to substantial image transfer, the photosensitive element and the receiving sheet may be detached from superposed relationship and a negative and a transfer positive image obtained.

In one embodiment, the silver stratum may be regenerated to its original form by, for example, scraping the residual silver halide from its surface or by immersing said silver stratum in a cell and reversing the polarity of the applied current employed to form the silver halide layer initially. The procedure may then be repeated to provide a fresh silver halide surface on the silver base.

It is unexpected that the present photosensitive element could be prepared and employed satisfactorily since it has been taught in the art that the presence of bulk silver in a photosensitive element results in fogging. However, in the novel photosensitive element of the present invention, substantially no fogging is obtained in spite of the relatively large mass of bulk silver present.

DETAILED DESCRIPTION OF THE INVENTION

The present invention is directed to a novel photosensitive element which comprises a layer of silver wherein at least a portion thereof has been converted to silver halide. Such element is prepared by imposing a constant current on a layer of silver in the presence of halide ions for a time sufficient to convert said silver to silver halide to a depth of at least three microns apparent thickness based on Faraday's law for the number of coulombs consumed for forming silver halide having a density of about 6.

Thus, the desired thickness may be obtained by carrying out the electrolysis according to the following formula:

$$\frac{\text{coulombs consumed}}{\text{cm.}^2}\times\frac{1\text{ mole}}{96{,}489\text{ coulombs}}\times\frac{\text{M.W. (g.)}}{1\text{ mole}}\times\frac{1}{D(\text{g./cm.}^3)}=\text{cm. thickness}$$

wherein mole, molecular weight and density (D) refer to silver halide. Since coulombs equals amps-seconds, a variety of combinations of times and current can be employed.

The photographic response of the novel photosensitive elements of the present invention may be enhanced by the employment of conventional sensitizing agents. Chemical sensitization of the photosensitive elements may be achieved by traditional procedures of the art. It is preferred, however, that chemical sensitization be carried out electrochemically substantially simultaneously with the formation of the silver halide. For example, sulfur sensitization may be achieved electrochemically by disposing sodium sulfide in the electrolyte during the formation of the photosensitive element. Chemical sensitization has been achieved in the present invention employing concentrations of sodium sulfide ranging from $10^{-3}$ to $10^{-9}$ moles/liter. It should be understood that concentrations of the chemical sensitizing material may be employed at higher or lower levels than those indicated in the above range. Employment of amounts less than the lower range will, of course, result in a diminished enhancement of photographic response while concentrations in excess of the higher indicated range may result in some fog formation. With respect to sodium sulfide, a concentration of $10^{-8}$ moles/liter is preferred.

Optical sensitization of the silver halide crystals in the photosensitive element of the present invention may be accomplished by contacting the thus-formed photosensitive element with optical sensitizing dye or dyes according to the procedures of the art or those described in Hamer, F.M., The Cyanine Dyes and Related Compounds. It is preferred that the optical sensitization be achieved by immersing the thus-formed photosensitive element in a solution of the dye or dyes for a time sufficient to optically sensitize silver halide.

A novel photosensitive element within the scope of the present invention may be prepared by immersing a sheet of silver foil 5 mils. thick into a solution (aqueous, alcohol, etc.) containing, for example, 1.0 mole/liter potassium halide (e.g., chloride, bromide, iodide or any combination thereof). An Elron potentiostat/galvanostat used in the constant current (galvanostat) mode may be used to impose a constant anodic current on the silver foil using a platinum counter electrode behind a glass frit. A reference electrode may be used to monitor the potential of the silver electrode with time as silver halide forms. The current density employed may range from 0.5 to 8, and is preferably 2 milliamps per square centimeter. The time may range from 2.5 to 40 minutes, preferably 9.6 minutes, corresponding to a potential at the end of 25 mv. versus Saturated Calomel Electrode.

A photosensitive element prepared according to the general procedure set forth above having a silver halide thickness of about 4 microns and a bromide-iodide ratio of 200:1 in solution during electrolysis was given an exposure of about 50 foot-candles-sec. and developed with a commercial Type 47 processing composition (Polaroid Corporation), Cambridge, Mass.) in superposed relationship with a Type 47 receiving layer (Polaroid Corporation, Cambridge, Mass.). A good positive image (unexposed silver) was transferred to said receiving sheet having a reflection silver density of 1.30 maximum and 0.09 minimum.

A photosensitive element prepared according to the general procedure above wherein the silver halide thickness was about 4 microns and the electrolytic solution contained a 200:1 bromide to iodide ratio and sodium sulfide at a concentration of $10^{-8}$ moles was given an exposure of about 46 foot-candles-sec. and processed as described above. Comparison with a control, that is, a photosensitive element prepared, exposed and developed in the same manner except that it contained no sensitizing agent, showed substantially no image with the control but a good positive transfer image with the element prepared with sodium sulfide indicating chemical sensitization.

A photosensitive element was prepared according to the general procedure described above having a silver halide thickness of about 4 microns and a bromide/iodide ratio of 200:1 in solution during electrolysis. The thus-formed element was then immersed into a methanol solution ($10^{-3}$ moles/liter) of 5,5′-dichloro-3,3′,9-triethylthiocarbocyanine iodide for one hour. The element was then air dried and along with a control was exposed through a color wedge. The exposed elements were then processed as described above. Whereas the control showed an image only in the inherent region (425–500 nm.), the optically sensitized element showed images also in the red region, i.e., approximately 700 nm.

In an alternative embodiment, the silver foil employed in forming the photosensitive element of the present invention may be carried on a suitable support, preferably a transparent polymeric support. Such supported photosensitive elements would be particularly suited for the preparation of transparent negatives. Any suitable support may be employed, for example, glass, polymeric films of both the synthetic type and those derived from naturally occurring products. Particularly suitable materials comprise transparent synthetic polymers such as polymethacrylic acid, methyl and ethyl esters; vinyl chloride polymers; polyvinyl acetals; polyamides such as nylon; polyesters such as the polymeric films derived from ethylene glycol terephthalic acid; polymeric cellulose derivatives such as cellulose acetate, triacetate, nitrate, propionate, butyrate, acetate butyrate or acetate propionate; polycarbonates; polystyrenes; and the like. Particularly preferred polymers which contain functional groups with an affinity for silver, such as polyphenylene sulfur.

Silver is preferably evaporated onto such support sheets to form the silver foil thickness necessary for electrolytic conversion to silver halide. If desired, the plastics are subjected to glow discharge prior to evaporation of the silver by conventional evaporative procedures that are known to the art. It is preferred that a silver deposit of approximately 5 microns be obtained although only sufficient silver to permit formation of the above-indicated minimum silver halide thickness.

In a preferred embodiment, the silver is deposited on a conducting transparent support such as Nesa glass. Preferably, a layer about 16 microns in thickness of silver is deposited by evaporation. Employing a 20:1 bromide/iodide solution substantially all the silver is converted to halide. An exposure of about 25,000 foot-candles-sec. and conventional processing with, for example, Eastman Kodak D–19 processing composition, resulted in a good negative image on the transparent support.

In forming photosensitive elements within the scope of the present invention from supported silver foil, it is preferred that not all of the silver be converted to silver halide and that a relatively small transparent amount of silver remain unconverted. In still another alternative embodiment of the present invention, a silver halide formed electrolytically in the sheet of silver foil may be removed from the unconverted silver or the polymeric support with which it is associated, as by scraping, and disposed in a conventional binder material such as gelatin and thereafter processed as a conventional photosensitive element.

Silver precipitating nuclei employed are conventional and well known to the art. Preferred are the heavy metal sulfides or selenides.

Suitable silver halide solvents for employment in the practice of the present invention include conventional fixing agents such as sodium thiosulfate, sodium thiocyanate, ammonium thiocyanate, the additional agents described in U.S. Patent No. 2,543,181, and the associations of cyclic amides and nitrogenous bases, such as associations of barbiturates or uracils and ammonia or amines, and other associations described in U.S. Patent No. 2,857,274.

The processing composition may also include an alkaline material, for example, sodium hydroxide, potassium hydroxide, sodium carbonate, or the like, most preferably in a concentration providing a pH to the processing composition in excess of about 12. The processing composition, where desired, may contain the sole silver halide developing agent or agents employed or a silver halide developing agent in addition to that disposed within the film unit. It will be apparent that the relative proportions of the agents comprising the developing composition set forth herein may be altered to suit the requirements of the operator. Thus, it is within the scope of the invention to modify the herein described composition by the inclusion of preservatives, alkalis, silver halide solvents, etc., other than those specifically mentioned. When desirable, it is also contemplated to include in the developing composition, components such as restrainers, accelerators, and the like. The concentration of such agents may be varied over a relatively wide range commensurate with the art.

What is claimed is:

1. A photosensitive element comprising a layer of silver wherein a portion of said silver has been converted electrolytically to silver halide which is prepared by imposing a constant current on a layer of silver in the presence of halide ion at a current density of about 0.5 to 8 milliamps/cm.$^2$ to convert a depth of at least 3 microns apparent thickness of said silver based on Faraday's law for the number of coulombs consumed for forming silver halide having a density of about 6.

2. A product as defined in claim 1 wherein said layer of silver is carried on one surface of a polymeric support.

3. A product as defined in claim 1 wherein said silver halide is chemically sensitized.

4. A product as defined in claim 1 wherein said silver halide is optically sensitized.

5. A product as defined in claim 4 wherein said silver halide is optically sensitized by a cyanine dye absorbed thereon.

6. A product as defined in claim 1 wherein said halide comprises bromide and iodide.

7. A product as defined in claim 1 wherein said bromide to iodide ratio is 200:1.

8. A process for preparing a photosensitive element which comprises imposing a constant current at a current density of about 0.5 to 8 milliamps/cm.$^2$ on a layer of silver in contact with halide ions for a time sufficient to convert to silver halide a depth of at least 3 microns apparent thickness based on Faraday's law for the number of coulombs consumed for forming silver halide having a density of about 6.

9. A process as defined in claim 8 wherein said solution includes means for chemically sensitizing said silver halide.

10. A process as defined in claim 8 wherein said solution includes means for optically sensitizing said silver halide.

11. A process as defined in claim 8 wherein said silver is carried on a polymeric support.

12. A process is defined in claim 11 wherein said support is an electrically conductive support.

13. A process as defined in claim 8 wherein said silver halide is optically sensitized by contacting said silver halide with a solution of an optical sensitizing dye.

14. A process as defined in claim 8 wherein said solution contains bromide and iodide ions in a ratio of about 200:1.

15. A process as defined in claim 8 wherein the current density is 2 milliamps per square centimeter.

16. A process for forming a photographic diffusion transfer image which comprises the steps of:

(a) exposing a photosensitive element comprising a layer of silver wherein a portion of said silver has been converted electrolytically to silver halide by imposing a constant current on a layer of silver in the presence of halide ion at a current density of about 0.5 to 8 milliamps/cm.$^2$ to convert a depth of at least 3 microns apparent thickness of said silver based on Faraday's law for the number of coulombs consumed for forming silver halide having a density of about 6;

(b) contacting said exposed silver halide with a processing composition containing a silver halide developing agent and a silver halide solvent; and (c) transferring an imagewise distribution of silver to a superposed image-receiving element.

17. A process as defined in claim 16 wherein said image-receiving layer contains silver precipitating nuclei.

18. A process for preparing a photographic silver halide emulsion which comprises the steps of imposing a constant current at a current density of about 0.5 to 8 milliamps/cm.$^2$ to a layer of silver in the presence of halide ions for a time sufficient to convert to silver halide a depth in said silver of at least 3 microns apparent thickness based on Faraday's law for the number of coulombs consumed for forming silver halide having a density of about 6; detaching said silver halide from said layer of silver; and disposing said silver halide in a permeable polymeric binder.

19. A process as defined in claim 18 wherein said polymeric binder comprises gelatin.

References Cited

UNITED STATES PATENTS

| | | | |
|---|---|---|---|
| 2,945,771 | 7/1960 | Mansfeld | 96—94 BF |
| 3,142,566 | 7/1964 | Land | 96—94 BF |
| 2,521,082 | 9/1950 | Mullen | 96—94 BF |
| 3,516,827 | 6/1970 | Schreck | 96—29 |

NORMAN G. TORCHIN, Primary Examiner

J. L. GOODROW, Assistant Examiner

U.S. Cl. X.R.

96—86